(12) United States Patent
Liao (10) Patent No.: US 7,311,186 B2
(45) Date of Patent: Dec. 25, 2007

(54) RATCHET TOOL HAVING INCREASED DRIVING TORQUE

(76) Inventor: Youn Chyuan Liao, No. 68-1, Fusin North Road, Situn, Taichung 40741 (TW)

( * ) Notice: Subject to any disclaimer, the term of this patent is extended or adjusted under 35 U.S.C. 154(b) by 226 days.

(21) Appl. No.: 11/204,526

(22) Filed: Aug. 16, 2005

(65) Prior Publication Data

US 2007/0039795 A1   Feb. 22, 2007

(51) Int. Cl.
  *B25B 13/46* (2006.01)
  *F16D 41/08* (2006.01)
(52) U.S. Cl. .............................. 192/43.2; 81/63.1
(58) Field of Classification Search ........... 192/43.2; 81/63.1
  See application file for complete search history.

(56) References Cited

U.S. PATENT DOCUMENTS

| 2,430,480 | A | * | 11/1947 | Pugh | 192/43.2 |
| 5,687,820 | A | | 11/1997 | Lin | 192/43.2 |
| 5,974,915 | A | | 11/1999 | Chou | 81/63.1 |
| 6,227,077 | B1 | | 5/2001 | Chiang | 81/63.1 |
| 6,250,183 | B1 | | 6/2001 | Chiang | 81/63.2 |
| 2004/0154439 | A1 | * | 8/2004 | Tuan-Mu | 81/58.4 |

* cited by examiner

*Primary Examiner*—Richard M Lorence
(74) *Attorney, Agent, or Firm*—Charles E. Baxley (57) ABSTRACT

A ratchet tool includes a barrel rotatably engaged into a cartridge and having a gear, two pawls slidably received in the cartridge and each having a base plane and a side plane and two or more teeth biased to engage with the gear of the barrel, and a control ferrule may control the engagement of the pawls with the gear of the barrel. The teeth of the pawls each includes two tooth surfaces having different included angles relative to the base plane of the pawl and relative to the side plane of the pawl, and having different included angles relative to each other, for allowing the barrel to be suitably rotated or driven by the cartridge with an increased driving torque.

6 Claims, 6 Drawing Sheets

RATCHET TOOL HAVING INCREASED DRIVING TORQUE

BACKGROUND OF THE INVENTION

1. Field of the Invention

The present invention relates to a ratchet tool, and more particularly to a ratchet tool having an improved pawl engaging mechanism for increasing a driving engagement to the driving shank, and for increasing a driving torque to the driving shank and thus to the fasteners.

2. Description of the Prior Art

Typical ratchet tools or ratchet mechanisms comprise a block or cartridge attached to a handle, a rod or gear rotatably engaged into the block or cartridge for coupling to a driving shank, and two pawls slidably engaged into the block or cartridge for being biased to engage with the rod or gear, in order to determine the driving direction of the driving shank.

For example, U.S. Pat. No. 5,687,820 to Lin, and U.S. Pat. No. 5,974,915 to Chou disclose two of the typical ratchet tools or ratchet mechanisms each also comprising a driving shank selectively coupled to a base cartridge of the handle with two pawls, and the pawls each includes a number of teeth for engaging with the teeth of the rod or gear or driving shank, in order to control the driving direction of the driving shank relative to the handle.

However, the teeth of the pawls and the teeth of the rod or gear or driving shank normally include a uniform or regular gear tooth structure, and normally, only one of the teeth of the pawls may be suitably engaged with the teeth of the rod or gear or driving shank particularly when the pawls are biased or forced to engage with the teeth of the rod or gear or driving shank by the handle, such that a weak engagement and a decreased driving torque may be formed between the pawls and the driving shank.

U.S. Pat. No. 6,227,077 to Chiang, and U.S. Pat. No. 6,250,183 to Chiang disclose two further typical ratchet tools or ratchet mechanisms each also comprising a driving shank selectively coupled to a base cartridge of the handle with two pawls, and the pawls each includes a number of teeth for engaging with the teeth of the rod or gear or driving shank, in order to control the driving direction of the driving shank relative to the handle.

However, similarly, the teeth of the pawls and the teeth of the rod or gear or driving shank also include a uniform or regular gear tooth structure, and only one of the teeth of the pawls may be suitably engaged with the teeth of the rod or gear or driving shank particularly when the pawls are biased or forced to engage with the teeth of the rod or gear or driving shank by the handle, such that a weak engagement and a decreased driving torque may be formed between the pawls and the driving shank.

The present invention has arisen to mitigate and/or obviate the afore-described disadvantages of the conventional ratchet tools.

SUMMARY OF THE INVENTION

The primary objective of the present invention is to provide a ratchet tool including an improved pawl engaging mechanism for increasing a driving engagement to the driving shank, and for increasing a driving torque to the driving shank and thus to the fasteners.

In accordance with one aspect of the invention, there is provided a ratchet tool comprising a cartridge for attaching to a tool handle, including a chamber formed therein, and including two channels formed therein and communicating with the chamber thereof, a barrel rotatably engaged into the chamber of the cartridge, and including a gear provided thereon, two pawls slidably received in the channels of the cartridge respectively, and each including a base plane and a side plane, and each including a curved surface formed therein and having at least one first tooth and at least one second tooth formed therein, in which the second tooth is located farther away from the base plane of the pawl as compared with the first tooth, means for biasing the first tooth and the second tooth of the pawls to selectively engage with the gear of the barrel, and a control ferrule rotatably attached onto the cartridge, for controlling an engagement of the pawls with the gear of the barrel. The first tooth and the second tooth of the pawls each includes a first tooth surface and a second tooth surface formed therein, the first tooth surface of the first tooth is inclined relative to the base plane of the pawl and includes an included angles $\alpha 1$ smaller than an included angle $\alpha 2$ of the first tooth surface of the second tooth, for allowing the teeth of the pawls to be suitably or snugly engaged with the gear, and for allowing the barrel to be suitably rotated or driven by the cartridge with an increased driving torque.

The second tooth surface of the first tooth is inclined relative to the side plane of the pawl and includes an included angles $\beta 1$ smaller than an included angle $\beta 2$ of the second tooth surface of the second tooth. The first tooth surface and the second tooth surface of the first tooth includes an included angles $\gamma 1$ greater than an included angle $\gamma 2$ of the first tooth surface and the second tooth surface of the second tooth, and also arranged for allowing the teeth of the pawls to be suitably or snugly engaged with the gear, and for allowing the barrel to be suitably rotated or driven by the cartridge with an increased driving torque.

The pawls each includes at least one third tooth formed therein and having a first tooth surface and a second tooth surface formed therein, in which the third tooth is located farther away from the base plane of the pawl as compared with the second tooth, and the first tooth surface of the second tooth includes an included angles $\alpha 2$ smaller than an included angle $\alpha 3$ of the first tooth surface of the third tooth.

The second tooth surface of the second tooth is inclined relative to the side plane of the pawl and includes an included angles $\beta 2$ smaller than an included angle $\beta 3$ of the second tooth surface of the third tooth.

The first tooth surface and the second tooth surface of the second tooth includes an included angles $\gamma 2$ greater than an included angle $\gamma 3$ of the first tooth surface and the second tooth surface of the third tooth.

The cartridge includes an inclined inner surface to define the channel thereof, for forming an included angle ($\theta$) between the inner surface of the cartridge and the side plane of the pawl.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
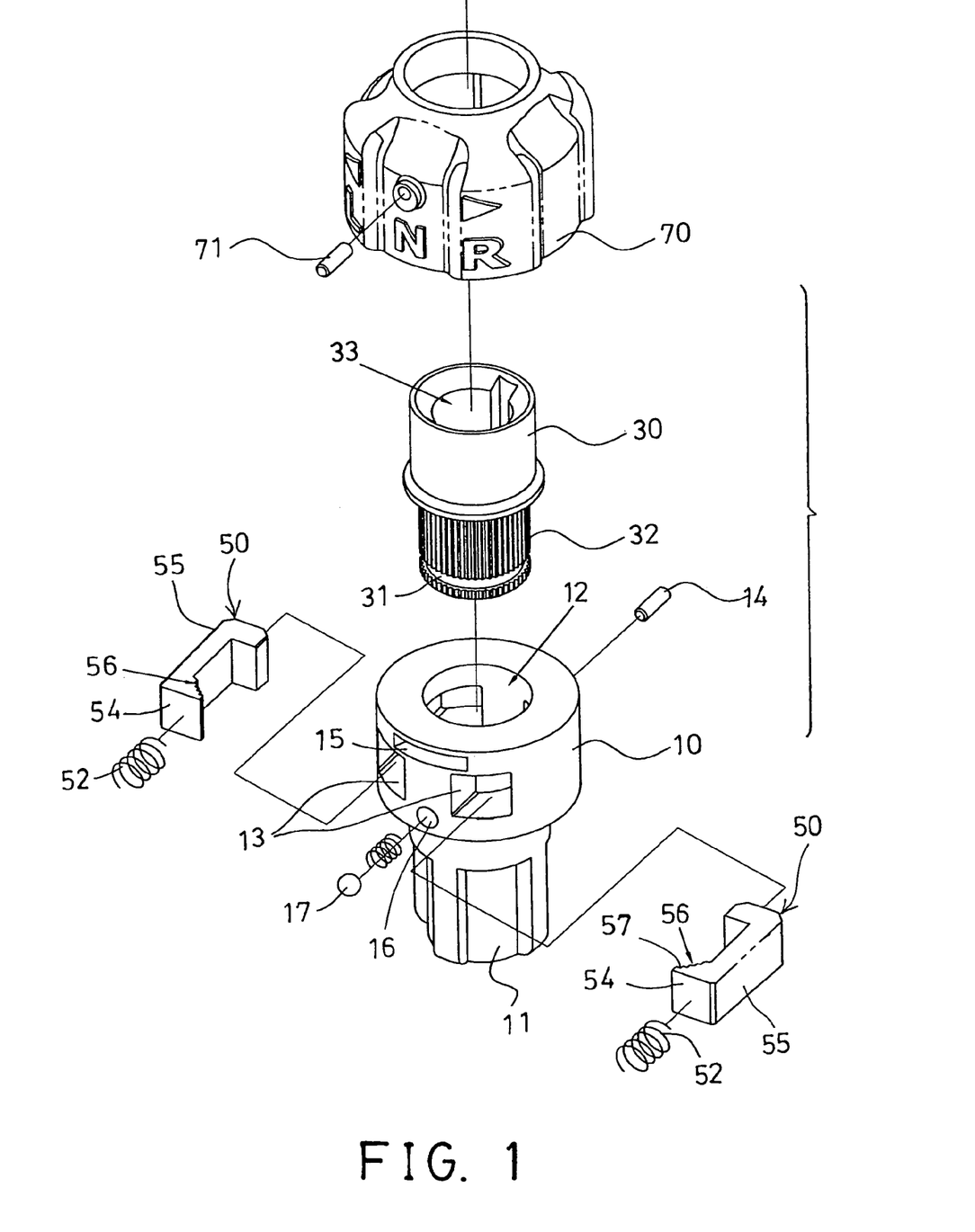
FIG. 1 is a partial exploded view of a ratchet tool in accordance with the present invention.
Figure 2:
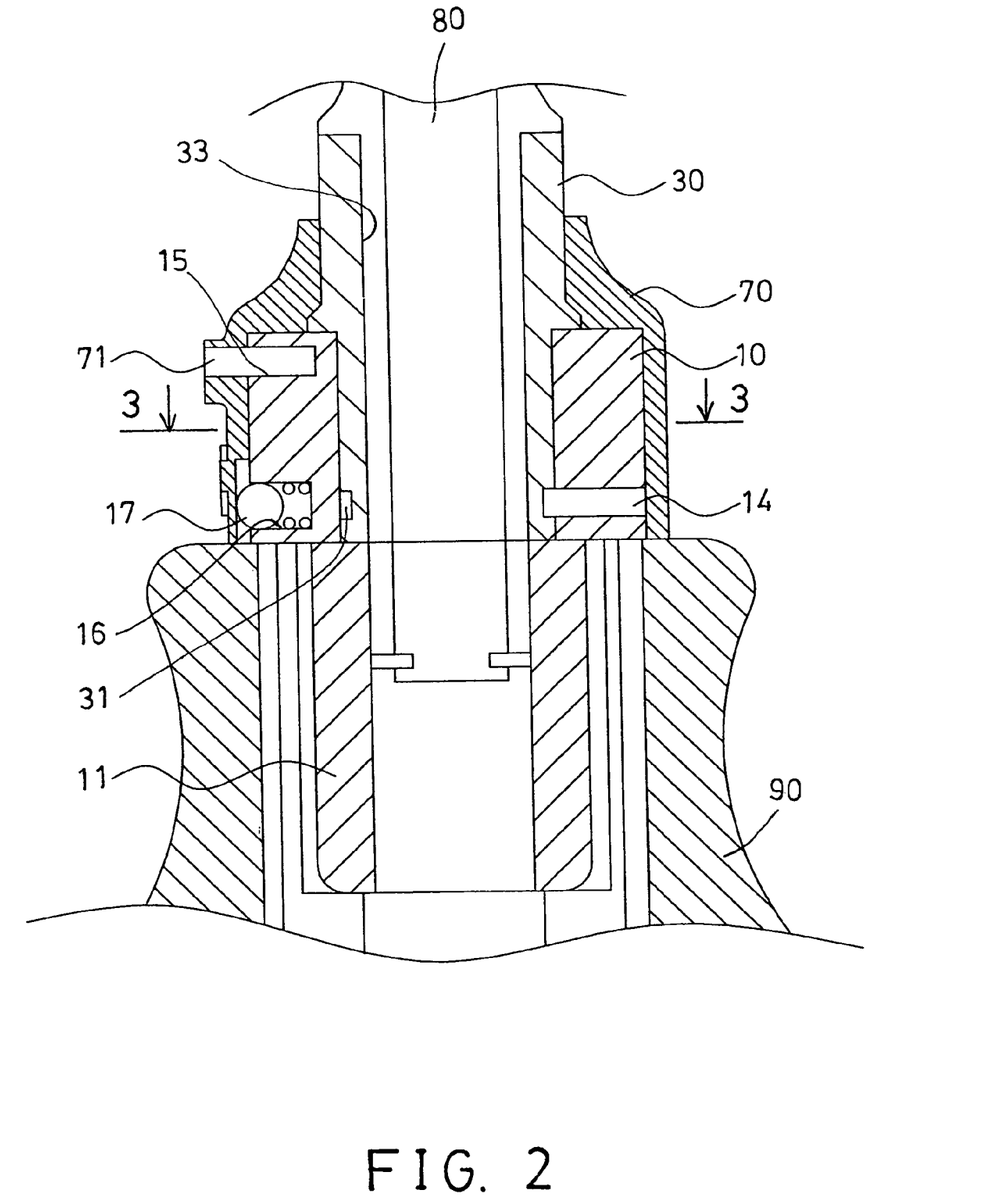
FIG. 2 is a partial cross sectional view of the ratchet tool, taken along lines 2-2 of FIG. 3.
Figure 3:
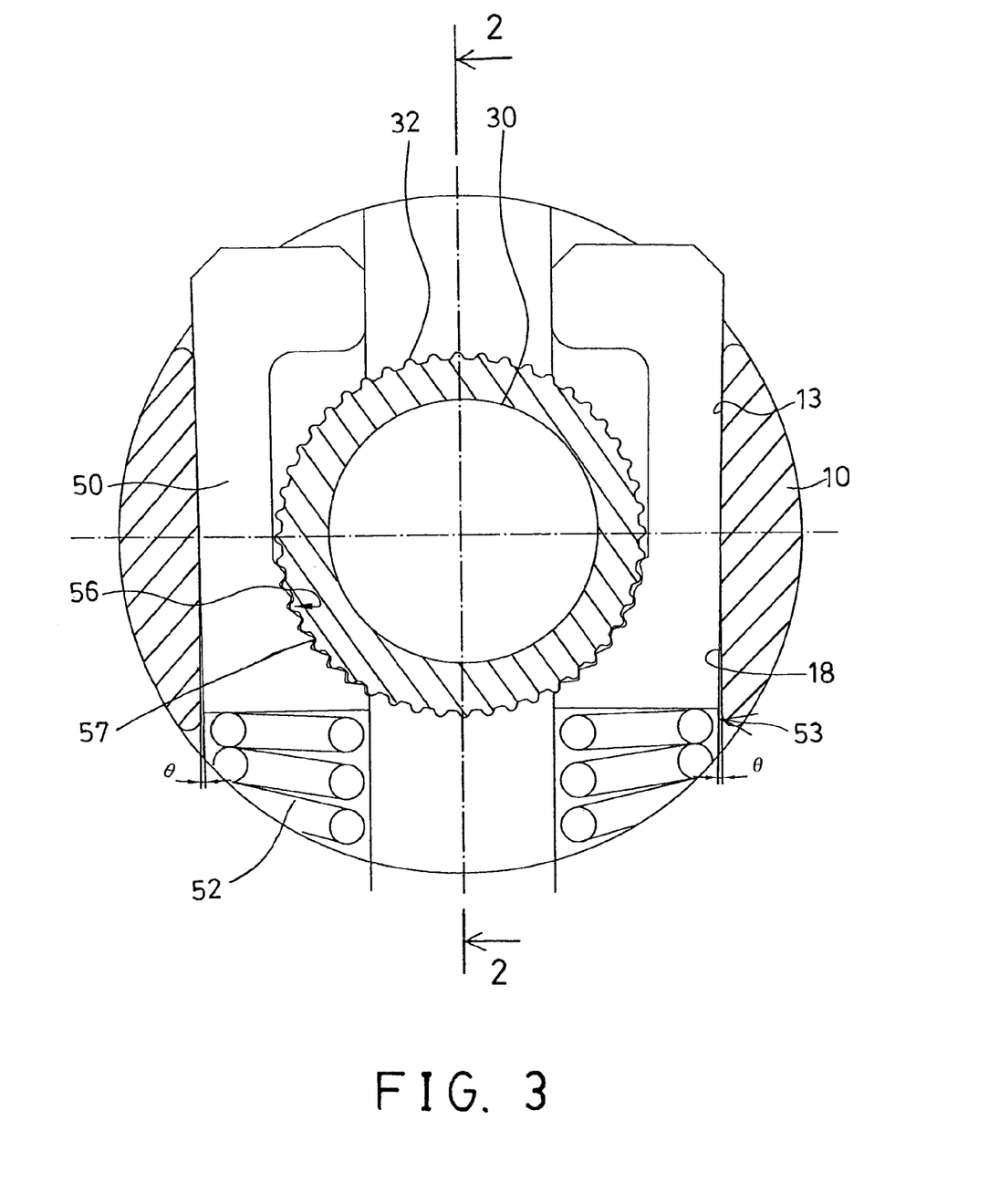
FIG. 3 is a partial cross sectional view of the ratchet tool, taken along lines 3-3 of FIG. 2.

Referring to the drawings, and initially to FIGS. 1-3, a ratchet tool in accordance with the present invention comprises a block or a cartridge 10 including an extension 11 extended therefrom, for coupling or attaching to a tool handle 90 (FIG. 2), and including a chamber 12 formed therein for rotatably receiving a sleeve or barrel 30 therein, and including two channels 13 formed therein and communicating with the chamber 12 thereof, each for slidably receiving a pawl 50 therein.

For example, the barrel 30 includes an annular recess 31 formed therein, and a positioning pin 14 is engaged into the cartridge 10, and engaged into the annular recess 31 of the barrel 30 (FIG. 2), for rotatably anchoring or securing the barrel 30 to the cartridge 10, and for preventing the barrel 30 from being disengaged from the cartridge 10. The barrel 30 includes a gear 32 formed or provided thereon, and includes a bore 33 formed therein for receiving or attaching a driving shank 80 thereto (FIG. 2).

The pawls 50 each includes two or more teeth 57, 58, 59 formed or provided thereon for engaging with the corresponding teeth of the gear 32, and a spring member 52 engaged with each of the pawls 50, for biasing the teeth 57, 58, 59 of the pawls 50 to engage with the corresponding teeth of the gear 32, and for determining or for controlling the driving direction of the barrel 30 and the driving shank 80 relative to the cartridge 10 and the handle 90 or by the cartridge 10 and the handle 90.

A control ferrule 70 is rotatably attached or engaged onto the cartridge 10, and includes the typical actuating surfaces (not shown) for engaging with the pawls 50 respectively, and for selectively controlling or disengaging the teeth 57, 58, 59 of the pawls 50 from the corresponding teeth of the gear 32. The engagement of the control ferrule 70 with the pawls 50 is typical and will not be described in further details, and has been disclosed in the cited arts, which may be taken as references for the present invention.

The cartridge 10 includes a slot 15 and a cavity 16 formed therein, and the control ferrule 70 includes a peg 71 engaged thereto and slidably engaged in the slot 15 of the cartridge 10, for limiting the control ferrule 70 to rotate relative to the cartridge 10. A spring-biased projection 17 is engaged in the cavity 16 of the cartridge 10, for positioning the control ferrule 70 to the cartridge 10 at selected positions, and for maintaining the engagement of the typical actuating surfaces of the control ferrule 70 with the pawls 50 respectively.

Figure 4:
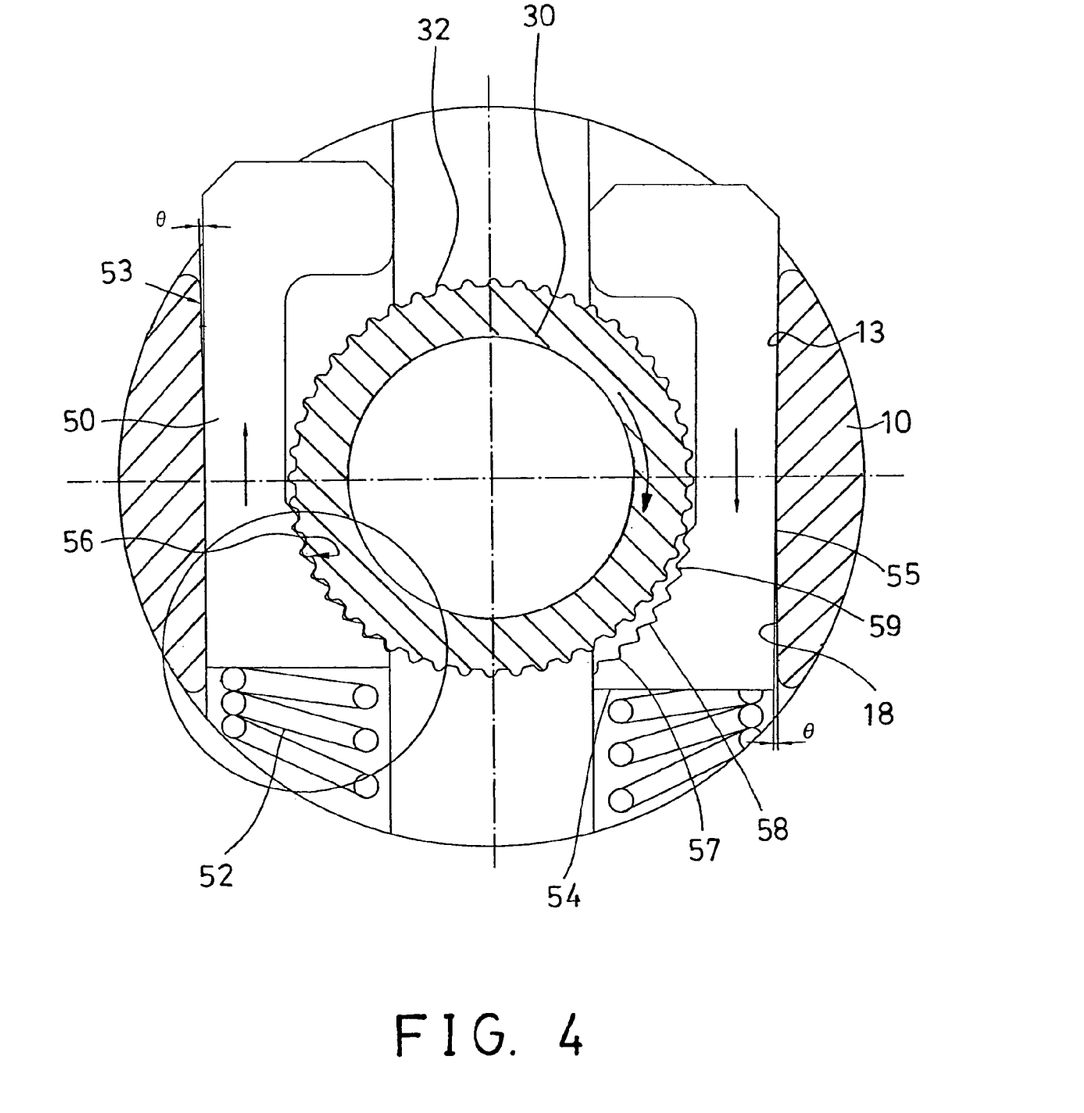
FIG. 4 is a partial cross sectional view similar to FIG. 3, illustrating the operation of the ratchet tool.
Figure 5:
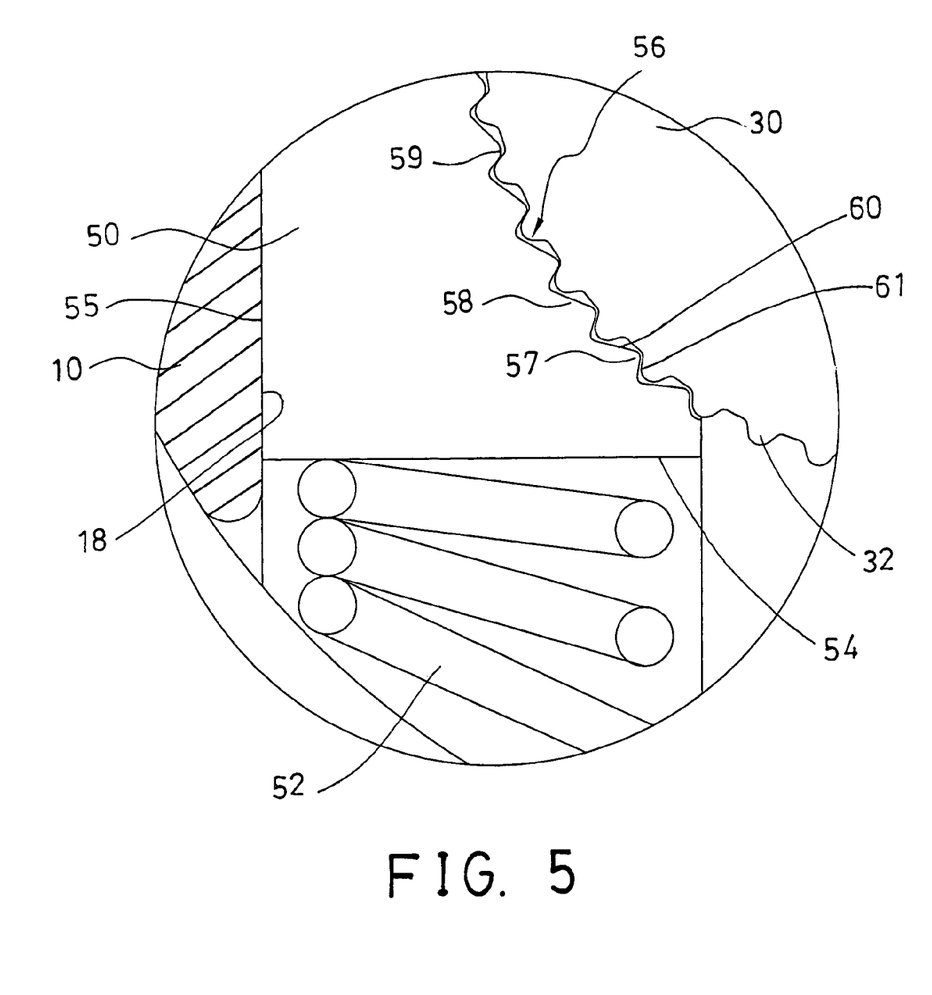
FIG. 5 is an enlarged partial cross sectional view of the ratchet tool.
Figure 6:
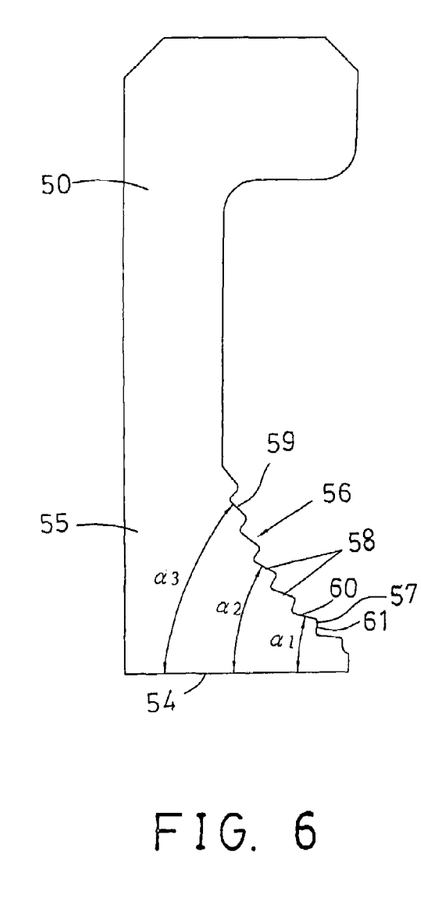
FIG. 6 is a plan schematic view illustrating one of the pawls of the ratchet tool.
Figure 7:
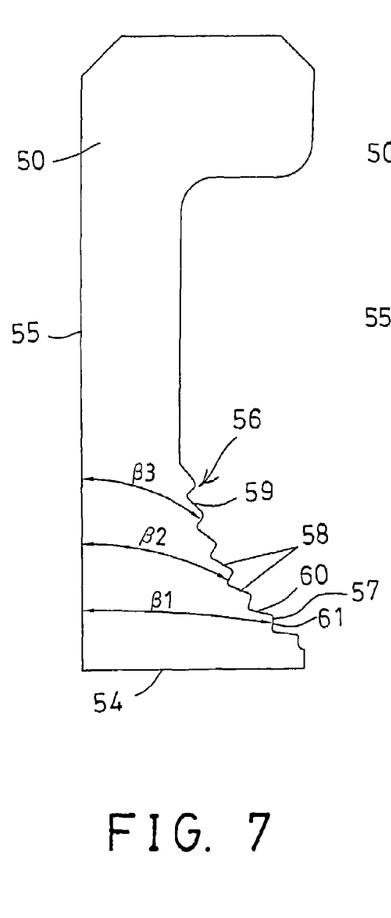
FIGS. 7, 8 are plan schematic views similar to FIG. 6, illustrating the other characteristics of the pawl of the ratchet tool.
Figure 8:
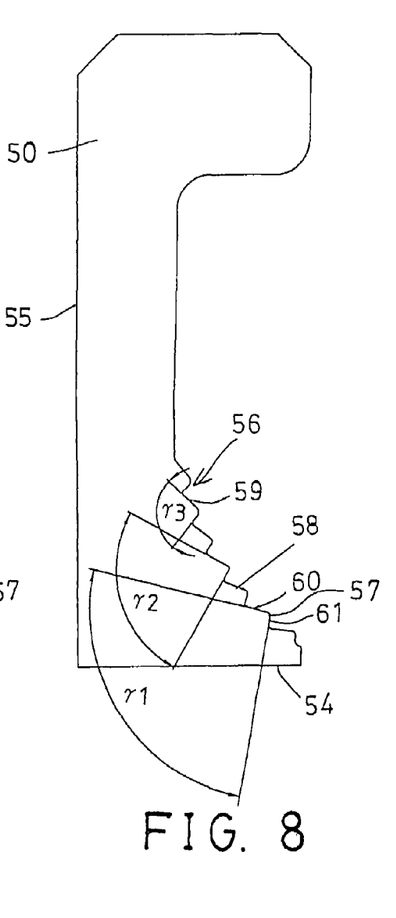

As shown in FIGS. 3-8, the pawls 50 each includes a base plane 54 and an outer side plane 55 that are substantially perpendicular to each other, and the side plane 55 is substantially parallel to the longitudinal direction of the channels 13 of the cartridge 10, such that the base planes 54 of the pawls 50 are substantially perpendicular to the channels 13 of the cartridge 10. It is preferable that the cartridge 10 includes a slightly inclined inner surface 18 to define the respective channel 13 thereof, for allowing the cartridge 10 to be easily disengaged from a molding device (not shown), and for forming a small included angle (θ) 53 between the inner surface 18 of the cartridge 10 and the outer side plane 55 of the pawl 50 (FIGS. 3, 4).

The pawls 50 each includes a curved surface 56 formed or provided therein, and each includes one or more first teeth 57 formed therein and located closer to the base plane 54 thereof, and one or more second teeth 58 formed therein and located farther away from the base plane 54 thereof as compared with the first teeth 57, and one or more third teeth 59 formed therein and located farther away from the base plane 54 thereof as compared with the first teeth 57 and the second teeth 58 of the pawl 50. The spring members 52 are preferably engaged with the base planes 54 of the pawls 50.

In addition, each of the teeth 57, 58, 59 includes two tooth surfaces 60, 61 formed therein, in which the one or first tooth surfaces 60 of the respective teeth 57, 58, 59 are inclined relative to the base plane 54 of the pawl 50, and have different included angles $\alpha 1$, $\alpha 2$, $\alpha 3$ with the base plane 54 of the pawl 50, and in which the included angle $\alpha 1$ of the tooth surfaces 60 of the first teeth 57 is smaller than the included angle $\alpha 2$ of the tooth surfaces 60 of the second teeth 58, that is smaller than the included angle $\alpha 3$ of the tooth surfaces 60 of the third teeth 59.

The other or second tooth surfaces 61 of the respective teeth 57, 58, 59 are inclined relative to the side plane 55 of the pawl 50, and also have different included angles $\beta 1$, $\beta 2$, $\beta 3$ with the side plane 55 of the pawl 50, and in which the included angle $\beta 1$ of the tooth surfaces 61 of the first teeth 57 is smaller than the included angle $\beta 2$ of the tooth surfaces 61 of the second teeth 58, that is smaller than the included angle $\beta 3$ of the tooth surfaces 61 of the third teeth 59.

In addition, the included angles $\gamma 1$, $\gamma 2$, $\gamma 3$ of the tooth surfaces 60, 61 of the respective teeth 57, 58, 59 are different from each other, and preferable that the included angle $\gamma 1$ of the tooth surfaces 60, 61 of the first teeth 57 is greater than the included angle $\gamma 2$ of the tooth surfaces 60, 61 of the second teeth 58, that is greater than the included angle $\gamma 3$ of the tooth surfaces 60, 61 of the third teeth 59. The arrangements of the included angles $\alpha 1$, $\alpha 2$, $\alpha 3$, $\beta 1$, $\beta 2$, $\beta 3$, and $\gamma 1$, $\gamma 2$, $\gamma 3$ are provided for allowing the teeth 57, 58, 59 of the pawls 50 to be suitably or snugly engaged with the corresponding teeth of the gear 32, and thus for allowing the barrel 30 to be suitably or effectively rotated or driven by the cartridge 10 with an increased driving torque, best shown in FIG. 5.

Accordingly, the ratchet tool in accordance with the present invention includes an improved pawl engaging mechanism for increasing a driving engagement to the driving shank, and for increasing a driving torque to the driving shank and thus to the fasteners.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A ratchet tool comprising:
   a cartridge for attaching to a tool handle, including a chamber formed therein, and including two channels formed therein and communicating with said chamber thereof,
   a barrel rotatably engaged into said chamber of said cartridge, and including a gear provided thereon, two pawls slidably received in said channels of said cartridge respectively, and each including a base plane and a side plane, and each including a curved surface formed therein and having at least one first tooth and at least one second tooth formed therein, in which said at least one second tooth is located farther away from said base plane of said pawl as compared with said at least one first tooth, means for biasing said at least one first tooth and said at least one second tooth of said pawls to selectively engage with said gear of said barrel, and a control ferrule rotatably attached onto said cartridge, for controlling an engagement of said pawls with said gear of said barrel, wherein said at least one first tooth and said at least one second tooth of said pawls each includes a first tooth surface and a second tooth surface formed therein, said first tooth surface of said at least one first tooth is inclined relative to said base plane of said pawl and includes an included angle ($\alpha 1$) formed between said first tooth surface of said at least one first tooth and said base plane of said pawl and smaller than an included angle ($\alpha 2$) that is formed between said first tooth surface of said at least one second tooth and said base plane of said pawl, and said second tooth surface of said at least one first tooth is inclined relative to said side plane of said pawl and includes an included angle ($\beta 1$) formed between said second tooth surface of said at least one first tooth and said side plane of said pawl and smaller than an included angle ($\beta 2$) that is formed between said second tooth surface of said at least one second tooth and said side plane of said pawl.

2. A ratchet tool comprising:

a cartridge for attaching to a tool handle, including a chamber formed therein, and including two channels formed therein and communicating with said chamber thereof, a barrel rotatably engaged into said chamber of said cartridge, and including a gear provided thereon, two pawls slidably received in said channels of said cartridge respectively, and each including a base plane and a side plane, and each including a curved surface formed therein and having at least one first tooth and at least one second tooth formed therein, in which said at least one second tooth is located farther away from said base plane of said pawl as compared with said at least one first tooth, means for biasing said at least one first tooth and said at least one second tooth of said pawls to selectively engage with said gear of said barrel, and a control ferrule rotatably attached onto said cartridge, for controlling an engagement of said pawls with said gear of said barrel, wherein said at least one first tooth and said at least one second tooth of said pawls each includes a first tooth surface and a second tooth surface formed therein, said first tooth surface of said at least one first tooth is inclined relative to said base plane of said pawl and includes an included angles ($\alpha 1$) formed between said first tooth surface of said at least one first tooth and said base plane of said pawl and smaller than an included angle ($\alpha 2$) that is formed between said first tooth surface of said at least one second tooth and said base plane of said pawl, and said first tooth surface and said second tooth surface of said at least one first tooth includes an included angle ($\gamma 1$) formed between said first tooth surface and said second tooth surface of said at least one first tooth and greater than an included angle ($\gamma 2$) that is formed between said first tooth surface and said second tooth surface of said at least one second tooth.

3. The ratchet tool as claimed in claim 1, wherein said pawls each includes at least one third tooth formed therein and having a first tooth surface and a second tooth surface formed therein, in which said at least one third tooth is located farther away from said base plane of said pawl as compared with said at least one second tooth, and said first tooth surface of said at least one second tooth includes said included angle ($\alpha 2$) that is formed between said first tooth surface of said at least one second tooth and said base plane of said pawl and smaller than an included angle ($\alpha 3$) that is formed between said first tooth surface of said at least one third tooth and said base plane of said pawl.

4. A ratchet tool comprising:

a cartridge for attaching to a tool handle, including a chamber formed therein, and including two channels formed therein and communicating with said chamber thereof, a barrel rotatably engaged into said chamber of said cartridge, and including a gear provided thereon, two pawls slidably received in said channels of said cartridge respectively, and each including a base plane and a side plane, and each including a curved surface formed therein and having at least one first tooth and at least one second tooth formed therein, in which said at least one second tooth is located farther away from said base plane of said pawl as compared with said at least one first tooth, means for biasing said at least one first tooth and said at least one second tooth of said pawls to selectively engage with said gear of said barrel, and a control ferrule rotatably attached onto said cartridge, for controlling an engagement of said pawls with said gear of said barrel, wherein said at least one first tooth and said at least one second tooth of said pawls each includes a first tooth surface and a second tooth surface formed therein, said first tooth surface of said at least one first tooth is inclined relative to said base plane of said pawl and includes an included angles ($\alpha 1$) formed between said first tooth surface of said at least one first tooth and said base plane of said pawl and smaller than an included angle ($\alpha 2$) that is formed between said first tooth surface of said at least one second tooth and said base plane of said pawl, and said pawls each includes at least one third tooth formed therein and having a first tooth surface and a second tooth surface formed therein, in which said at least one third tooth is located farther away from said base plane of said pawl as compared with said at least one second tooth, and said first tooth surface of at least one second tooth includes said included angle ($\alpha 2$) that is formed between said first tooth surface of said at least one second tooth and said base plane of said pawl and smaller than an included angle ($\alpha 3$) that is formed between said first tooth surface of said at least one third tooth and said base plane of said pawl, and said second tooth surface of said at least one second tooth is inclined relative to said side plane of said pawl and includes an included angle ($\beta 2$) formed between said second tooth surface of said at least one second tooth and said side plane of said pawl smaller than an included angle (β3) that is formed between said second tooth surface of said at least one third tooth and said side plane of said pawl.

5. A ratchet tool comprising:

a cartridge for attaching to a tool handle, including a chamber formed therein, and including two channels formed therein and communicating with said chamber thereof, a barrel rotatably engaged into said chamber of said cartridge, and including a gear provided thereon, two pawls slidably received in said channels of said cartridge respectively, and each including a base plane and a side plane, and each including a curved surface formed therein and having at least one first tooth and at least one second tooth formed therein, in which said at least one second tooth is located farther away from said base plane of said pawl as compared with said at least one first tooth, means for biasing said at least one first tooth and said at least one second tooth of said pawls to selectively engage with said gear of said barrel, and a control ferrule rotatably attached onto said cartridge, for controlling an engagement of said pawls with said gear of said barrel, wherein said at least one first tooth and said at least one second tooth of said pawls each includes a first tooth surface and a second tooth surface formed therein, said first tooth surface of said at least one first tooth is inclined relative to said base plane of said pawl and includes an included angle (α1) formed between said first tooth surface of said at least one first tooth and said base plane of said pawl and smaller than an included angle (α2) that is formed between said first tooth surface of said at least one second tooth and said base plane of said pawl, and said pawls each includes at least one third tooth formed therein and having a first tooth surface and a second tooth surface formed therein, in which said at least one third tooth is located farther away from said base plane of said pawl as compared with said at least one second tooth, and said first tooth surface of at least one second tooth includes said included angle (α2) that is formed between said first tooth surface of said at least one second tooth and said base plane of said pawl and smaller than an included angle (α3) that is formed between said first tooth surface of said at least one third tooth and said base plane of said pawl, and said first tooth surface and said second tooth surface of said at least one second tooth includes an included angle (γ2) formed between said first tooth surface and said second tooth surface of said at least one second tooth and greater than an included angle (γ3) that is formed between of said first tooth surface and said second tooth surface of said at least one third tooth.

6. The ratchet tool as claimed in claim 1, wherein said cartridge includes an inclined inner surface to define said channel thereof, for forming an included angle (θ) between said inner surface of said cartridge and said side plane of said pawl.

\* \* \* \* \*